July 27, 1965 E. B. TRICKEY 3,197,273
PROCESS FOR THE CONTINUOUS PRODUCTION OF CYANOGEN CHLORIDE
Filed July 31, 1961
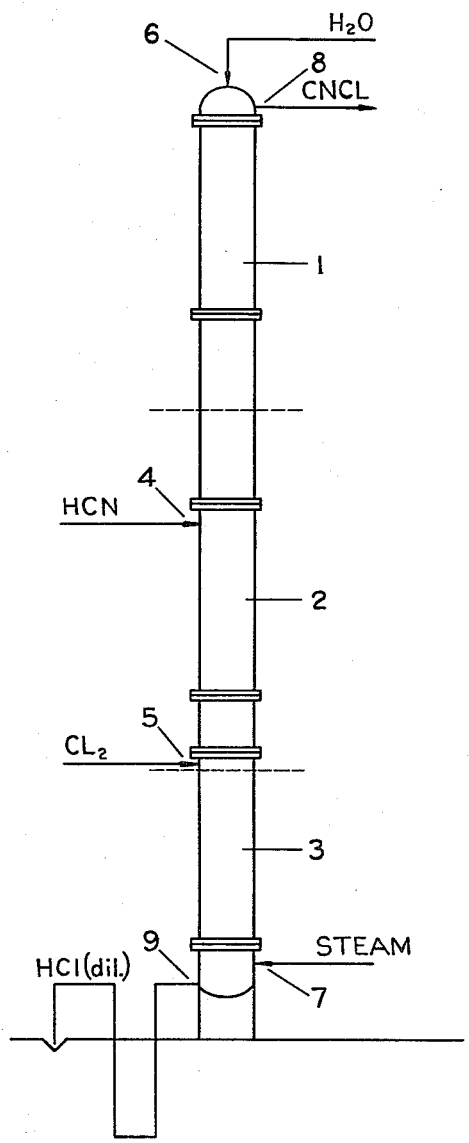
INVENTOR
Elwood Bruce Trickey
ATTORNEY
Karl F. Jorda 3,197,273
PROCESS FOR THE CONTINUOUS PRODUCTION
OF CYANOGEN CHLORIDE
Elwood Bruce Trickey, Chicasaw, Ala., assignor to Geigy
Chemical Corporation, Town of Greenburgh, N.Y., a
corporation of Delaware
Filed July 31, 1961, Ser. No. 128,164
3 Claims. (Cl. 23—14)

The present invention relates to production of cyanogen chloride and more particularly to an improved process for the continuous production of cyanogen chloride in good yield and of high purity.

Cyanogen chloride is, from a commercial point of view, exceedingly valuable as it may be polymerized or, more specifically, trimerized to form cyanuric chloride, which in turn is a very useful chemical intermediate for the manufacture of many products, as for example chemotherapeutic agents, herbicides, dyes, brightening agents, synthetic resins, plastics, rubber, explosives and other materials. For many of these uses, particularly in the manufacture of brightening agents, it is highly desirable that the cyanuric chloride employed be of a relatively high degree of purity.

It is well known in the art that cyanogen chloride may be produced by the action of free chlorine on hydrocyanic acid in accordance with the following equation:

$$HCN + Cl_2 \rightarrow ClCN + HCl$$

Various processes are known to carry out this reaction as, for example, a process whereby the reaction between chlorine and an aqueous hydrocyanic acid solution is effected in a column wherein the chlorine gas is passed in counter-current to the hydrocyanic acid solution (U.S. Patent 1,588,731). According to another process the reaction between chlorine and hydrocyanic acid is carried out in a column with the aqueous solution of hydrocyanic acid being circulated around and constituting a cycle process (U.S. Patent 2,672,398).

However, these procedures have proven to be unsatisfactory from a commercial point of view because either a reaction product was obtained which contained considerable quantities of hydrocyanic acid and hydrochloric acid as impurities which it is difficult to remove or the equipment employed was unduly complicated. It is indispensable that the cyanogen chloride to be used for the manufacture of cyanuric chloride must be essentially free from hydrocyanic acid and hydrochloric acid and should contain an excess of unreacted chlorine. A simplified apparatus is highly advantageous because undue handling of obnoxious, toxic and corrosive substances is reduced and the quantity of these dangerous materials in process is diminished without impairing the rate of production.

The principal object of the present invention is to overcome the disadvantages inherent in prior art methods. Another object of this invention is to provide an improved and simplified process for the continuous production of cyanogen chloride of a quality eminently suitable for the preparation of cyanuric chloride. Other objects and advantages will become apparent from the following description.

It has now been found unexpectedly and surprisingly that cyanogen chloride, singularly suitable for immediate conversion to cyanuric chloride, may be prepared in good yield and of high purity by a process which can be readily carried out in a single column of great simplicity. The subject process is illustrated diagrammatically in the accompanying drawing.

The process practiced in accordance with this invention utilizes a closed system, i. e., a column which is equipped with a number of sampling valves as well as thermometers and consists from top to bottom of three sections as follows: a purification, washing or scrubbing section 1, a reaction section 2 and a stripping section 3. Chlorine and hydrogen cyanide are charged into the reaction section 2 of the column, with the hydrogen cyanide inlet 4 being above that 5 for chlorine. Water is fed to the column at the top 6 of the scrubbing section 1, while steam is introduced at the base 7 of the column. The temperature of the water that is fed to the top of the column is 13–25° C., preferably 15–20° C. The reason for maintaining the water at such temperature is that below 13° C. liquid cyanogen chloride may form in the top of the column while at a temperature of over 25° C. not all the hydrogen cyanide may be stripped out of the cyanogen chloride.

The reaction between chlorine and hydrocyanic acid takes place predominantly in a zone within the reaction section 2. The position of the reaction zone within the reaction section as well as its extent can be varied and controlled or adjusted by means of the placement of the chlorine and hydrocyanic acid inlets, the rate of input of reactants and the rate of steam and water flow. It is desirable that the center of this reaction zone be located in the middle portion of the reaction section 2. It is further desirable that the top of the reaction zone be maintained as low as possible in the reaction section 2 and that the bottom of the reaction zone does not extend into the stripping section 3. Contamination of the cyanogen chloride by hydrocyanic acid as well as undesirable hydrolysis of both cyanogen chloride and hydrocyanic acid are thereby substantially reduced and cyanogen chloride of high yield and great purity is thus obtained.

The cyanogen chloride formed leaves, after passing through the scrubbing section 1 wherein HCN and HCl is removed, at the top of the column 8 admixed with water vapors and 0.2–15%, and preferably 5%, of chlorine. This amount of chlorine is essential to prevent the catalyst from being poisoned in the subsequent preparation of cyanuric chloride from cyanogen chloride by trimerization. The presence of any excess of chlorine has, of course, the advantage of assuring completion of the desired reaction and reducing the amount of unreacted hydrocyanic acid.

The product gas stream which contains water vapors is passed through dehydrators as it is essential to remove as much moisture as possible from the cyanogen chloride in order to prevent poisoning of the catalyst in the trimerizer wherein cyanogen chloride is converted to cyanuric chloride.

The dilute aqueous hydrochloric acid formed leaves or is withdrawn from the column through an outlet 9 at its base after passing through the stripping seection 3 wherein it is heated to remove dissolved hydrocyanic acid and cyanogen chloride. The temperature at the top of the stripping section 3 should be 70–100° C., while the temperature at the bottom should be 102–110° C. Maintenance of such temperatures is a factor in obtaining high yields of cyanogen chloride by reducing the hydrolysis of hydrocyanic acid and cyanogen chloride as well as loss of hydrogen cyanide in the aqueous solution leaving the column.

The invention may be illustrated in greater detail by the following examples; it is, however, not limited thereto. The temperatures herein are given in degrees centigrade.

*Example 1*

Water (133 lbs./hr.), maintained at 13–15°, was fed to the top of a glass process column packed with one-fourth inch Raschig rings. This column had the following dimensions: over-all length, 29¾'; combined length of washing and reaction section, 16¾'; length of the stripping section, 5'; diameter of the washing and reaction sections, 4"; and diameter of stripping section, 6". Approximately 24 lbs./hr. of steam was then added at the base of the column so that the temperature was 100° in the bottom or stripping section of the column. Liquid chlorine was fed to a chlorine vaporizer and the chlorine gas measured by a rotameter. From there 10.70 lbs./hr. (0.152 lb. mole/hr.—5% excess) of chlorine was charged at the lower part of the reaction section of the column (4½' from the bottom) and 3.91 lbs./hr. (0.145 lb. mole/hr.) of hydrogen cyanide (99.5%) maintained in drop tanks at 0–5° by cooling with methanol, was added through an inlet 8½' upward from the bottom of the column. For the normal continuous operation of the column the water feed was maintained uniformly by measuring with a rotameter, as was also done with respect to the flow of hydrogen cyanide. The feed of chlorine was adjusted to maintain an excess of 5% of chlorine and the steam flow reduced as required to maintain a minimum temperature of 100° at the bottom of the column to prevent the possibility that traces of cyanogen chloride and hydrogen cyanide are dissolved in the liquid leaving the column. The temperature in the column decreased gradually as follows:

| Position: | Temperature, degrees |
|---|---|
| Bottom of column | 102 |
| 1' from bottom | 100 |
| 2' from bottom | 100 |
| 3' from bottom | 95 |
| 4' from bottom | 80 |
| 5' from bottom | 75 |
| 6' from bottom | 72 |
| 7' from bottom | 64 |
| 8' from bottom | 58 |
| 9' from bottom | 52 |
| 10' from bottom | 45 |
| 11' from bottom | 38 |
| 12' from bottom | 33 |
| 13' from bottom | 28 |
| 14' from bottom | 26 |
| 15' from bottom | 25 |
| 16' from bottom | 24 |
| 17' from bottom | 23 |
| 18' from bottom | 22 |
| 19' from bottom | 20 |
| 20' from bottom | 18 |
| 21' from bottom | 17 |
| Top of column | 13 |

The cyanogen chloride leaving the column together with water vapors and the excess of chlorine was passed through dehydrators. There was recovered 8.5 to 8.9 lbs./hr. of cyanogen chloride (100%), which corresponds to a yield of 95–100% of theory based on HCN.

*Example 2*

The procedure described in Example 1 was followed. The column used was identical. However, in this experiment 15.0 lbs./hr. (0.211 lb. mole/hr.—2.4% excess) of chlorine and 5.6 lbs./hr. (0.20 lb. mole/hr.) of hydrogen cyanide (99.5%) were charged to column. The water feed was the same as given in Example 1. Approximately 18 lb./hr. of steam was added. The temperature ranges in this experiment varied as follows:

| Position: | Temperature, degrees |
|---|---|
| Bottom of column | 102 |
| 1' from bottom | 100 |
| 2' from bottom | 100 |
| 3' from bottom | 90 |
| 4' from bottom | 80 |
| 5' from bottom | 75 |
| 6' from bottom | 69 |
| 7' from bottom | 68 |
| 8' from bottom | 63 |
| 9' from bottom | 58 |
| 10' from bottom | 54 |
| 11' from bottom | 54 |
| 12' from bottom | 54 |
| 13' from bottom | 49 |
| 14' from bottom | 42 |
| 15' from bottom | 34 |
| 16' from bottom | 28 |
| 17' from bottom | 26 |
| 18' from bottom | 23 |
| 19' from bottom | 21 |
| 20' from bottom | 18 |
| 21' from bottom | 16 |
| Top of column | 15 |

There was obtained 11.5 lbs./hr. of cyanogen chloride (100°) which corresponds to a yield of 92% of theory based on HCN. The gaseous reaction product analyzes as follows after drying by passing over calcium chloride: cyanogen chloride, 96.2%; HCN, less than 0.1%; $Cl_2$, 2.4%; $CO_2$, 0.3%; air, 1.0% and HCl, less than 0.1%.

What is claimed is:

1. An improved and simplified process for the continuous production in a one-column closed system of cyanogen chloride in high yields and of great purity adapted for immediate conversion to cyanuric chloride which comprises (a) charging chlorine and hydrogen cyanide to a reaction section in the middle portion of said column, the chlorine being in excess by about 5% and the hydrogen cyanide being introduced to said reaction section superiorly to the chlorine, (b) feeding water to a purification section in the upper portion of said column in order to remove hydrogen cyanide and hydrogen chloride from the product gas stream which passes therethrough, (c) passing steam into a stripping section at the base of said column in order to remove hydrogen cyanide and cyanogen chloride dissolved in the dilute hydrogen chloride formed, (d) adjusting and then uniformly maintaining the rate of input of hydrogen cyanide and chlorine and the rate of steam and water flow so that the formation of cyanogen chloride takes place predominantly in a reaction zone located in the middle portion of said reaction section and (e) recovering cyanogen chloride admixed with about 5% of chlorine from the top of said column;

the temperature in said column decreasing from 102–110° C. at the bottom to 15–20° C. at the top.

2. An improved and simplified process for the continuous production of cyanogen chloride in high yields and of great purity adapted for immediate conversion to cyanuric chloride which comprises the steps of (a) feeding water to the head of a purification section in the upper portion of a one-column closed system, (b) passing steam into the base of a stripping section in the lower portion of said column, (c) charging chlorine and hydrogen cyanide to a reaction section in the middle portion of said column, the chlorine being in excess by about 5% and the hydrogen cyanide being introduced to said reaction section superiorly to the chlorine, (d) adjusting and then uniformly maintaining the rate of input of hydrogen cyanide and chlorine and the rate of steam and water flow so that the formation of cyanogen chloride takes place predominantly in a reaction zone located in the middle portion of said reaction section, the temperature in said column gradually decreasing from about 102° C. at the bottom to about 15° C. at the top, (e) withdrawing (1) the product gas stream consisting essentially of cyanogen chloride, about 5% of chlorine and water vapors after removal of hydrogen cyanide and hydrogen chloride therefrom on its passage through the purification section and (2) dilute hydrogen chloride from the base of said column after removing therefrom in said stripping section hydrogen chloride and cyanogen chloride dissolved therein and (f) thereafter drying said product gas stream to remove said water vapors.

3. In a process for the continuous production of cyanogen chloride by reacting hydrogen cyanide and chlorine in a closed reaction system, the improvement which consists of (a) charging chlorine and hydrogen cyanide continuously to a reaction section in the middle portion of a one-column closed system, the chlorine being in excess by about 5% and the hydrogen cyanide being introduced into said reaction section superiorly to the chlorine, (b) feeding water to a purification section in the upper portion of said column in order to remove hydrogen cyanide and hydrogen chloride from the product gas stream which passes therethrough, (c) passing steam into a stripping section at the base of said column in order to remove hydrogen cyanide and cyanogen chloride dissolved in the dilute hydrogen chloride formed, (d) adjusting and then uniformly maintaining the rate of input of hydrogen cyanide and chlorine and the rate of steam and water flow so that the formation of cyanogen chloride takes place predominantly in a reaction zone located in the middle portion of said reaction section, the temperature in said column gradually decreasing from 102–110° C. at the bottom to 15–20° C. at the top and (e) recovering cyanogen chloride admixed with about 5% of chlorine from the top of said column, said admixture of cyanogen chloride and chlorine being adapted for immediate conversion to cyanuric chloride.

References Cited by the Examiner
UNITED STATES PATENTS

| | | | |
|---|---|---|---|
| 1,588,731 | 6/26 | Heuser | 23—14 |
| 2,391,490 | 12/45 | Thurston et al. | 23—14 |
| 2,672,398 | 3/54 | Huemer et al. | 23—14 |
| 2,753,346 | 7/56 | Huemer | 23—14 |

MAURICE A. BRINDISI, *Primary Examiner.*